Patented May 23, 1933

1,911,131

UNITED STATES PATENT OFFICE

FREDERICK C. LANGENBERG, OF EDGEWATER PARK, AND HORACE S. HUNT AND HERBERT G. REDDICK, OF BURLINGTON, NEW JERSEY, ASSIGNORS TO UNITED STATES PIPE AND FOUNDRY COMPANY, OF BURLINGTON, NEW JERSEY, A CORPORATION OF NEW JERSEY

PLASTICIZED PITCH COMPOUND AND METHOD OF MAKING THE SAME

No Drawing. Application filed July 29, 1931. Serial No. 553,894.

Our invention relates to the manufacture of a plasticized pitch compound especially intended and well adapted for the lining of pipes by the centrifugal process, though useful also for other purposes. The objects which we have in view are especially to provide a plasticized pitch compound which will retain a high degree of plasticity at low temperatures, say down to zero Fahrenheit and which will not become too plastic so as to flow or wrinkle at comparatively high temperatures, say up to 170° F. Further objects which we have in view are to provide a lining compound for pipes, tanks, etc, which will not impart a disagreeable taste to water passing through or contained therein and which at melting temperature of say from 330° F. to 450° F. would become sufficiently liquid to permit of its application by centrifugal or other known methods as a coating material; a further object is to provide a coating compound which when applied will be free from a tendency to produce a pitted surface and will produce a very smooth, even surface, while at the same time the coating will be strongly adherent to the surface to which it is applied.

Plasticized pitch compounds have heretofore been made by thoroughly mixing together melted pitch and melted asphalt with a view of increasing the plasticity of the pitch at low temperature and it has been attempted to modify the tendency of such a compound to flow or wrinkle at higher temperatures by incorporating in the mixture a filler, which, however, when used in sufficient quantity to make a compound comparatively stable at high temperature, greatly impairs its plasticity at low temperature, making the compound liable to crack, and the presence of the filler in the compound also impairs the adhesion between the lining and the pipe or other receptacle to which it is applied. We have discovered that by thoroughly incorporating in a mixture of pitch and asphalt a small percentage of a phenolic aldehyde condensation product of the class commercially and scientifically known as the A class of phenolic aldehyde condensation products and preferably of a consistency when cold approximating that of a thick molasses and then subjecting the mixture to temperatures which will effect a polymerization of the condensation product that a plasticized pitch compound is produced which will retain sufficient plasticity at low temperatures, say in the neighborhood of zero Fahrenheit, to obviate the tendency to crack and which at temperatures of 170° F. or even higher will be free from liability to flow and wrinkle. For use as a centrifugally applied lining for pipes our new compound incorporating the polymerized phenolic aldehyde condensation product is most advantageously used without the incorporation of any filler, though for other uses the incorporation of a filler in the compound may sometimes be of advantage.

In the preparation of our compound pitch and asphalt together with a percentage of a phenolic aldehyde condensation product, which should be of about the consistency of a thick molasses at normal temperatures, are mixed and melted at temperatures which will enable a thorough mixture of the component parts to be effected without coking the mass or local overheating and which will result in the polymerization of the phenolic aldehyde condensation product. The melting and admixture of the compound is best effected in an oil bath and the compound should be maintained in a molten condition until all gases evolved are eliminated. Preferably the evolution and removal of the gas is effected under vacuum and while the gas can be eliminated by maintaining the temperature and the fusion of the compound for a sufficient length of time, we have sometimes found it advantageous to re-melt the compound two or three times.

For the best results in lining pipe centrifugally we have formed a compound by mixing the ingredients in the proportion of 200 pounds of pitch to 60 or 70 pounds of asphalt and 10 to 20 pounds of the phenolic aldehyde condensation product, though good results in other applications can be obtained in using asphalt in the proportion of from 10 to 80 pounds and by using the condensation product in the proportion of from 5 to 30 pounds.

While any condensation product of the A class is adapted for use in our process and compound, we would state that we have found the phenolic aldehyde condensation product commercially known as XR 302, which at normal temperatures is a thick fluid, especially well adapted for our purposes.

For the best results we bring the mixed ingredients as rapidly as possible with avoidance of local overheating to a temperature of 450° F. and maintain the melted material at this temperature with active stirring for at least ten minutes. In heating the compounded materials in an oil bath to the temperature of 450° F., we have found the best results in gradually raising the temperature through a period of from 2 to 3 hours and find it necessary to maintain the material at the temperature of 450° F. with active stirring for about ten minutes and we would note that it is not advisable to maintain the melted compound at this temperature for a period exceeding one hour. We then allow the mixture to cool and solidify, and again, with precaution against local overheating, re-fuse it and raise its temperature to 425° F., maintaining it at this temperature with active stirring for another period of at least ten minutes. After this the material is again permitted to cool and solidify and is ready for reheating and application in the fluid state as a coating material.

The extent of the polymerization or condensation of the phenolic aldehyde condensation product incorporated in the compound and which is brought about by the exposure of the condensation product to high temperatures is such as to bring about the solidification of the condensation product to an elastic and flexible solid, the distribution of which through the mass of pitch and asphalt imparts to the compound as a whole sufficient plasticity at low temperatures to prevent cracking and sufficient coherence at high temperatures to prevent the running or wrinkling of the compound. This stage of condensation or polymerization is brought about by the heat treatment to which the compound is subjected as above set forth, and is not, we find, impaired by such reheating as the compound is ordinarily subjected to preparatory to its use as a coating, lining or for other purposes, but it must be had in mind that the polymerization or condensation of the phenolic aldehyde product is a progressive process and care must be exercised not to over heat the compound or to heat it for so long a time as to bring about the formation of a condensation product which is hard and brittle rather than elastic and flexible.

Our process involving the introduction of the condensation product into the compound in a state of polymerization or condensation in which it is a viscous fluid at normal temperatures not only results in the polymerization of the condensation product to the desired degree but also in the depolymerization of certain of the unsaturated cyclic hydrocarbons occurring in the asphalt and this also, we believe, is of marked advantage in the product both in removing elements which might tend to impart a taste to water but also in making the compound more adherent to the pipe or other receptacle to which it is applied.

We have expressed our preference for the use of a condensation product in the stage of condensation or polymerization in which it is a viscous fluid at normal temperatures. The most desirable consistency of the fluid may be described as that in which it is substantially as viscous as a heavy black coal tar of specific gravity of 1.22. More fluid condensation products would of course condense or polymerize under the heat treatments to which the compound is subjected but would require a more protracted heating to bring them to the desired consistency and this would be undesirable because it would tend to bring about an undesirable decomposition in the asphalt constituent of the compound.

It will, of course, be understood that by the word "pitch" as used in this specification, we have reference to the substance familiarly known by this name and commercially produced from coal tar by driving off from the tar its volatile constituents. It has been called to our attention that the name "pitch" has also been used in connection with several quite different materials as, for instance, "stearin pitch", "burgundy pitch" and, sometimes, as to certain resinous gums. Such substances are, however, entirely unfitted for use in our product and we wish it to be clearly understood that by the word "pitch" as used in our claims, we mean that substance ordinarily produced by the distillation of coal tars and commonly used in admixture with asphalt to form coating compounds.

Having now described our invention, what we claim as new and desire to secure by Letters Patent, is:

1. The method of compounding a pitch compound of diminished tendency to crack at low temperatures or flow at high temperatures, which consists in forming a mixture of melted pitch and asphalt and thoroughly incorporating therewith a phenolic aldehyde condensation product in the stage of condensation in which it is a fluid at normal temperature and of the kind which on the application of heat is progressively polymerized through a stage in which it becomes at normal temperature an elastic and flexible solid, to a stage in which it becomes a hard and brittle solid and maintaining the mixed ingredients of the compound at a high temperature for a sufficient length of time to bring about the condensation of the phenolic aldehyde condensation product to the stage in which it becomes an elastic and flexible solid.

2. The method of claim 1 in which the compound is made up of asphalt in the proportion of 10 to 80 pounds to each 200 pounds of pitch and in which the phenolic aldehyde condensation product is used in the proportion of from 5 to 30 pounds to each 200 pounds of pitch.

3. The method of claim 1 in which the mixed ingredients are maintained at a temperature of 450° F. with active stirring for a period of not less than ten minutes, then permitted to cool and again reheated to a temperature of approximately 425° F. with active stirring for another period of at least ten minutes.

4. A compound adapted for use as a coating and lining material, characterized by diminished liability to crack at low temperatures or to become fluid at comparatively high temperatures, consisting of an intimate mixture of pitch, asphalt and a phenolic aldehyde condensation product in the stage of condensation in which it is an elastic and flexible solid and of the kind which, in different stages of condensation, is progressively at normal temperature a fluid, an elastic and flexible solid and a hard and brittle solid.

5. The compound as called for in claim 4 in which the ingredients are approximately in the proportion of 200 pounds of pitch to 10 to 80 pounds of asphalt and 5 to 30 pounds of the phenolic aldehyde condensation product.

FREDERICK C. LANGENBERG.
HORACE S. HUNT.
HERBERT G. REDDICK.